United States Patent
Rankin

(10) Patent No.: US 8,100,000 B1
(45) Date of Patent: Jan. 24, 2012

(54) DEVICE AND METHOD FOR DETECTING VEHICLE ENGINE PULSE GENERATOR PLATE TOOTH DEFECTS

(75) Inventor: Brent Rankin, Lima, OH (US)

(73) Assignee: Honda Motor Co., Ltd., Tokyo (JP)

(*) Notice: Subject to any disclaimer, the term of this patent is extended or adjusted under 35 U.S.C. 154(b) by 274 days.

(21) Appl. No.: 12/415,706

(22) Filed: Mar. 31, 2009

(51) Int. Cl.
*G01M 15/02* (2006.01)

(52) U.S. Cl. ................... 73/114.77; 73/114.03

(58) Field of Classification Search ............... 73/114.02, 73/114.03, 114.04, 114.77
See application file for complete search history.

(56) References Cited

U.S. PATENT DOCUMENTS

| | | | |
|---|---|---|---|
| 4,178,541 A | 12/1979 | Brihier | |
| 6,609,498 B2 | 8/2003 | Mathews et al. | |
| 6,644,273 B1 | 11/2003 | Hagari et al. | |
| 6,827,063 B2* | 12/2004 | Breitegger et al. | 123/406.58 |
| 6,990,405 B2 | 1/2006 | Nakamura | |
| 7,000,598 B2* | 2/2006 | Sheikh et al. | 123/476 |
| 7,066,016 B2 | 6/2006 | Wildman | |
| 7,350,405 B2* | 4/2008 | Sheikh et al. | 73/114.04 |
| 2003/0037767 A1* | 2/2003 | Breitegger et al. | 123/406.58 |
| 2005/0263138 A1* | 12/2005 | Sheikh et al. | 123/476 |
| 2007/0256482 A1* | 11/2007 | Sheikh et al. | 73/116 |

* cited by examiner

*Primary Examiner* — Eric S McCall
(74) *Attorney, Agent, or Firm* — Standley Law Group LLP

(57) ABSTRACT

A device and its method of use for in situ detection of bent and/or broken teeth on a vehicle engine pulse generator plate. The device includes a pair of detection sensors adapted to detect pulse generator plate teeth during rotation of a pulse generator plate, and a controller in communication with the sensors. The sensors are arranged such that one sensor leads the other with respect to the detection of teeth on a rotating pulse generator plate. Rotation of a pulse generator plate in the presence of the sensors will cause the sensors to produce an output signal each time a tooth passes by. The signals from the sensors form associated pulse trains that are evaluated by a microprocessor device and associated program of the controller to determine if the pulse generator plate has any bent and/or broken teeth.

20 Claims, 6 Drawing Sheets

DEVICE AND METHOD FOR DETECTING VEHICLE ENGINE PULSE GENERATOR PLATE TOOTH DEFECTS

BACKGROUND OF THE INVENTIVE FIELD

The present invention is directed to a device for detecting a defective vehicle engine pulse generator plate. More specifically, the present invention is directed to a device for detecting bent or missing teeth on a vehicle engine pulse generator plate.

A pulse generator plate may be coupled to a vehicle crankshaft for the purpose of timing the vehicle's engine. The design of such a pulse generator plate may vary. One known embodiment generally comprises a circular plate having a number of circumferentially spaced tabs or teeth extending therefrom. A pulse generator plate is typically hidden behind a timing chain/belt cover and, therefore, is not readily visible or accessible on an assembled engine.

A sensor (e.g., crank sensor) is normally also mounted near the pulse generator plate, and is also typically enclosed within the timing chain/belt cover. The sensor produces an electrical pulse each time one of the teeth of the pulse generator plate passes by. Electrical pulses produced by the sensor may be transmitted to a vehicle control computer or other device used to control the timing of the vehicle's engine. As would be understood by one of skill in the art, the electrical pulses may be used to vehicle engine.

It occasionally happens that one or more teeth of a pulse generator plate become bent or broken before or during installation of the pulse generator plate and associated crankshaft to an engine block. While a completely missing pulse generator plate tooth may be clearly visible, a tooth may be bent or otherwise damaged to an extent that interferes with its detection by a crank sensor without the damage being visually obvious (at least not without a detailed and time consuming visual inspection). A bent or missing pulse generator plate tooth may be the source of, or contribute to, engine timing problems.

Once an engine has been assembled, it becomes more difficult to ascertain whether a pulse generator plate tooth is bent or broken. For example, conducting a visual inspection of an engine's pulse generator plate teeth may require removal of the oil pan. Certain engine designs may even require a more substantial engine disassembly to determine if a pulse generator plate tooth is bent or broken. This can be a time-consuming process that also may first require the removal of various other engine parts. Therefore, it would be understood that being able to determine whether a pulse generator plate contains bent and/or missing teeth without the need for engine disassembly would be desirable. A device and method of the present invention enables such a determination to be made.

SUMMARY OF THE GENERAL INVENTIVE CONCEPT

The present invention is directed to a pulse generator plate analyzer and a method of using such a device for detecting bent and/or broken teeth on a pulse generator plate of a vehicle engine. A device of the present invention generally includes a test fixture for association with an engine of interest, the test fixture having a pair of detection sensors that are operative to detect the teeth of a pulse generator plate. A device of the present invention allows for a quick an accurate determination regarding pulse generator plate tooth damage, eliminating the need to conduct a time consuming, and potentially faulty, visual inspection of the pulse generator plate.

The test fixture is typically coupled to a controller that houses the electronics of the device. A controller of the present invention may include, without limitation, a microprocessor for controlling the device as well as an amplifier section, a signal conditioning section, an output conditioning section, and one or more indicator lights. The controller is in communication with the detection sensors of the test fixture.

In operation, a user associates the test fixture with a vehicle engine of interest, ensuring that the test fixture is properly located so that the detection sensors can detect the teeth of the engine's pulse generator plate. With the test fixture in place on the vehicle engine, a user rotates the crankshaft, whether manually or with a powered tool. As the crankshaft is rotated, the associated pulse generator plate is also rotated. Rotation of the pulse generator plate causes the teeth thereof to pass within detection range of the detection sensors of the test fixture.

The detection sensors generate an electrical pulse (output signal) each time a tooth of the pulse generator plate is detected. These output signals are sent to the controller where various manipulation thereof may take place. For example, the output signals may be sent to an amplifier where the current and/or voltage thereof may be increased to a level that is more compatible with the other electronic components of the controller. The output signals may be further routed through a signal conditioner where unwanted electrical noise may be removed.

Regardless of the incoming signal manipulation that might occur, the output signals are eventually routed to an appropriately programmed microprocessor device where the signals are processed to determine if all of the pulse generator teeth are present and in proper condition. If the microprocessor device determines that all of the pulse generator teeth are present, a signal may be sent to activate an indicator, such as a light, which informs the user that the pulse generator plate is not damaged. Conversely, if the microprocessor determines that one or more of the pulse generator teeth are bent and/or broken, a signal may be sent to activate an indicator that informs the user that the pulse generator plate is damaged.

A device of the present invention is highly portable and may be easily moved from engine to engine. Consequently, a device of the present invention can be used to quickly detect a damaged pulse generator plate without requiring time-consuming engine disassembly.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Figure 1:
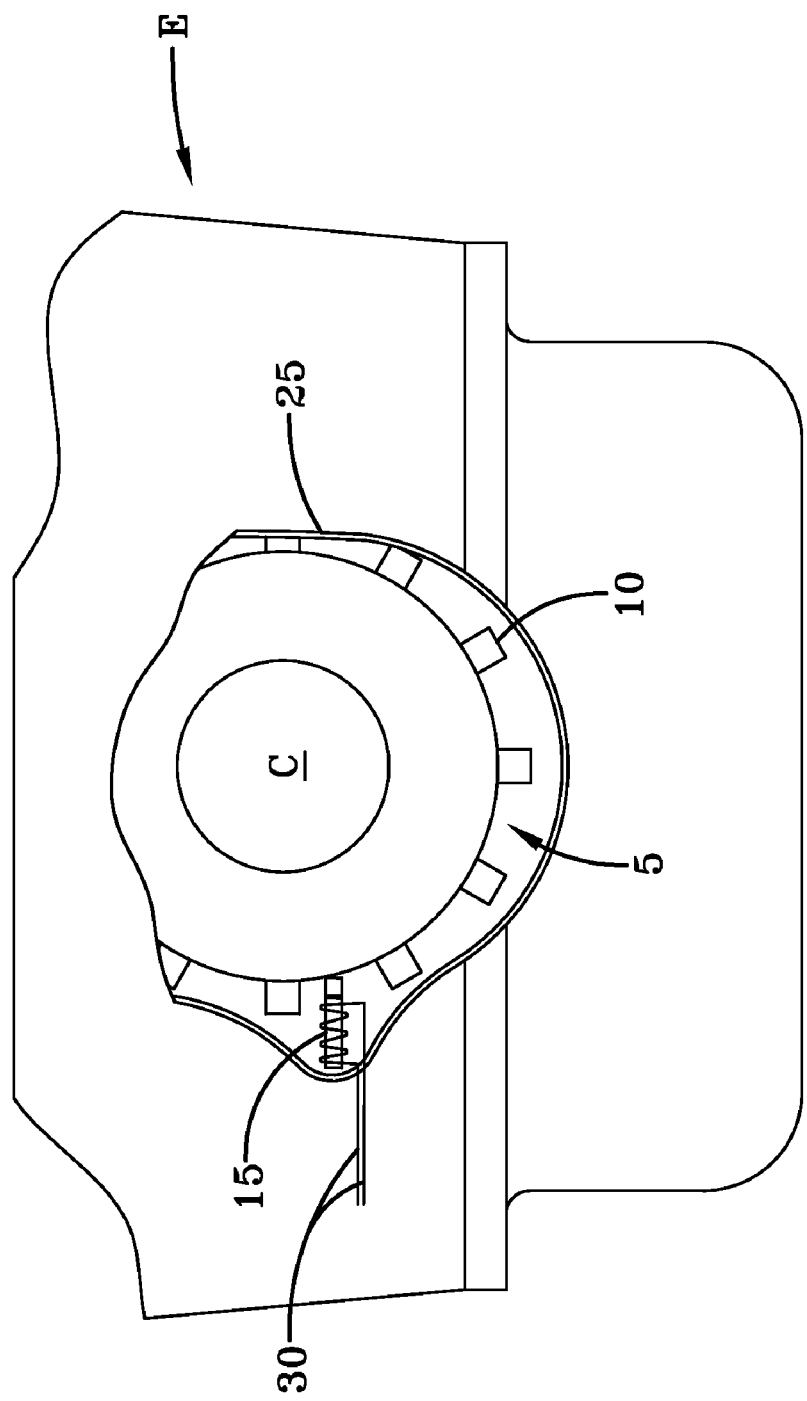
FIG. 1 depicts a typical pulse generator plate and associated sensor installed to the crankshaft of a vehicle engine, wherein various engine components have been removed for clarity.

As described above, vehicle engines may employ timing systems that make use of a pulse generator plate. FIG. 1 depicts a representative pulse generator plate 5 installed to the crankshaft C of an automobile engine E. As shown, the pulse generator plate 5 is a round plate having a central aperture adapted to receive a portion of an associated crankshaft. The particular pulse generator plate 5 shown includes a number of circumferentially spaced teeth 10 that extend outward from its periphery.

In order to assist with vehicle timing, a sensor 15 is mounted near the pulse generator plate 5. The sensor 15 detects each passing of a tooth on the pulse generator plate 5. When the sensor 15 detects a tooth 10, it generates an output signal that may be sent via sensor wiring 30 to an associated vehicle computer for use in timing the vehicle's engine.

As can be observed in FIG. 1, both the pulse generator plate 5 and its associated sensor 15 are typically located within a sealed timing chain/belt cover 25 (and oil pan) of the engine E. Consequently, both the pulse generator plate 5 and the sensor 15 are typically hidden from view once the engine E has been assembled.

Figure 2:
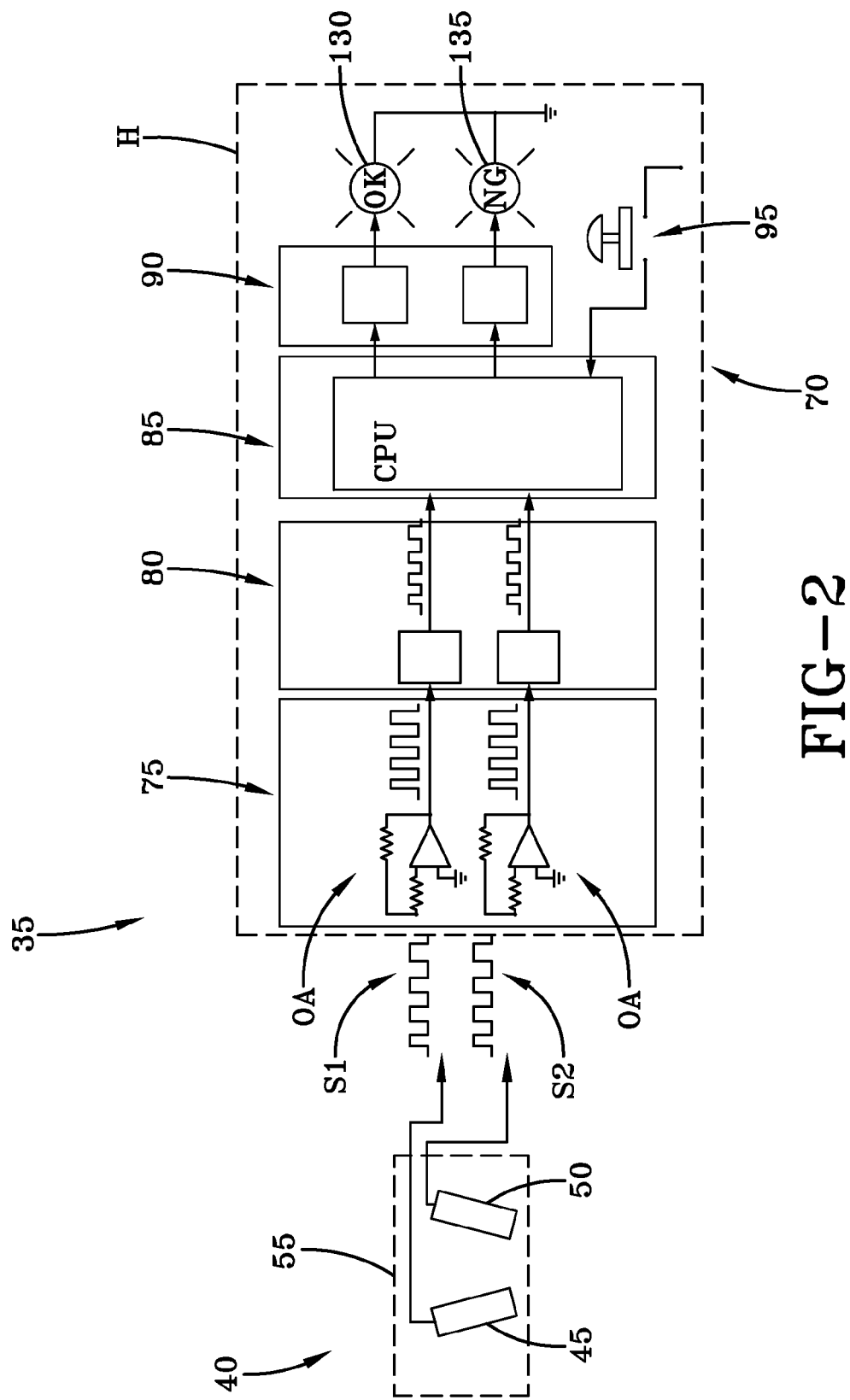
FIG. 2 schematically illustrates an exemplary embodiment of a pulse generator plate analyzer of the present invention.

One exemplary embodiment of a pulse generator plate analyzer device (device) 35 of the present invention is schematically illustrated in FIG. 2. The device 35 includes a test fixture 40 that is adapted for temporary association with a vehicle engine of interest. This particular embodiment of the test fixture 40 is shown to include a pair of detection sensors 45, 50, although other embodiments may use more than one pair of sensors. Various types of sensors may be used in the test fixture as long as the selected sensors are able to accurately and reliably detect the teeth of pulse generator plates of interest. For example, the detection sensors 45, 50 may be comprised of a ferrous metal core and magnet that resides within a coil of wire having some predetermined number of turns. Of course, one skilled in the art would clearly realize that the use of other detection sensor designs is also possible, and the present invention is therefore not limited to any particular detection sensor type.

The sensors 45, 50 are preferably located within a housing 55 for easy transport and location to a vehicle engine. The housing may 55 be comprised of various materials and may be of various shape and size to better conform to a particular vehicle engine to be analyzed.

Figure 3:
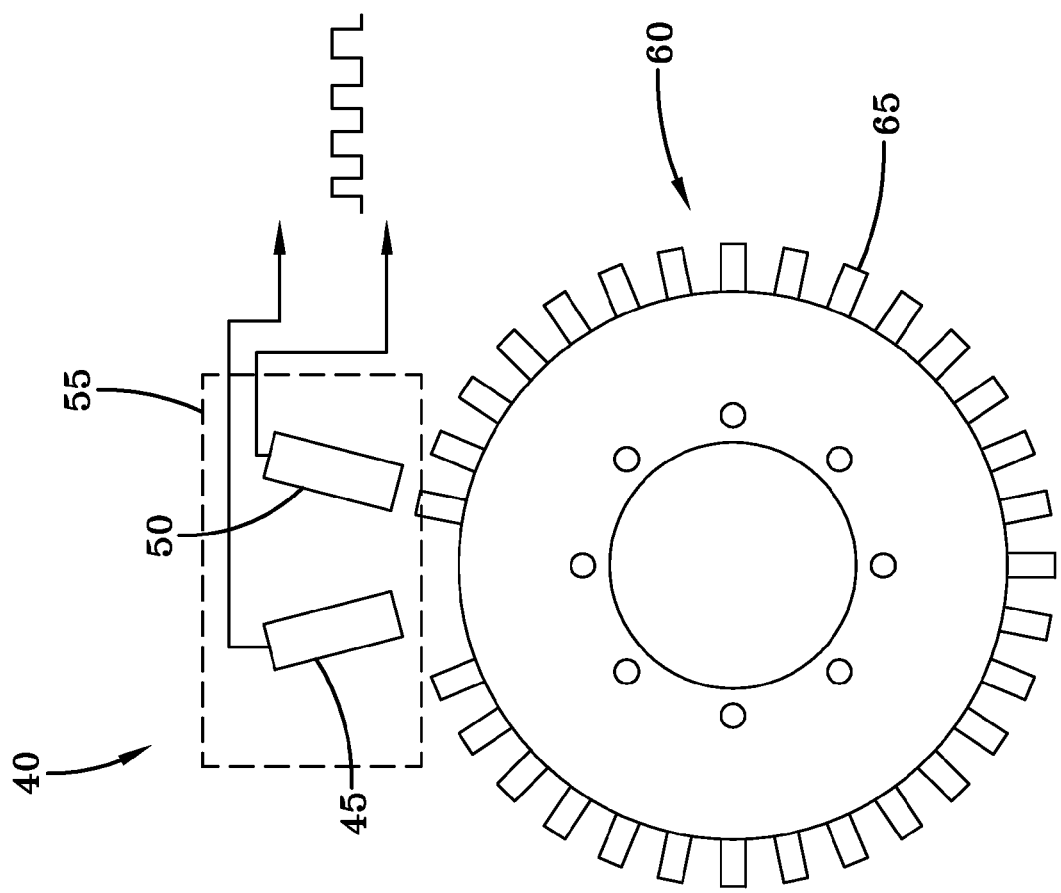
FIG. 3 shows a test fixture portion of the device of FIG. 2 associated with a pulse generator plate of a vehicle engine, wherein the engine components have been substantially removed for clarity.

As can be observed in FIG. 3, the test fixture 40 is temporarily engaged with a vehicle engine (not shown) when the device 35 is in use. Ideally, the test fixture 40 is engaged with a vehicle engine in a manner that allows the detection sensors 45, 50 to reside in proximity to the pulse generator plate 60 to be analyzed. The housing 55 of the test fixture 40 may be adapted in size and/or shape to facilitate such a location of the test fixture 40. In certain embodiments of the invention, temporary engagement of the test fixture 40 with a vehicle engine may be accomplished by simply resting the test fixture on a receiving surface of the engine. Alternatively, the housing 55, or elements associated with the housing, may be provided to produce engaging contact between the test fixture and a vehicle engine. For example, magnetic engagement may be employed, or the test fixture 40 may have one or more brackets or other elements specifically designed to engage a corresponding element(s) on a vehicle engine.

The maximum distance from which the detection sensors 45, 50 can detect the teeth 65 of the pulse generator plate 60 may depend on a number of factors. For example, the particular sensor design and type employed, the size and/or composition of the pulse generator plate teeth, and the type and thickness of the test fixture housing material may all play a factor. Preferably, however, the test fixture 40 is located to a vehicle engine before a timing chain/belt cover and other interfering components are installed, thereby permitting the detection sensors 45, 50 to be placed as close as possible to the teeth of the pulse generator plate.

Referring back to FIG. 2, the test fixture 40 is shown to be in communication with a controller 70. Like the test fixture 40, the components of the controller 70 may be enclosed within a housing H for convenience and protection. The particular controller 70 shown in FIG. 2 includes an amplification section 75 followed by an incoming signal conditioning section 80, a microprocessor device 85, and an output signal conditioning section 90. However, it should be realized that other embodiments of a controller of the present invention may vary.

The amplification section 75 of the controller 70 receives incoming output signals S1, S2 from the detection sensors 45, 50, and amplifies the voltage level of the signals. Various amplifier designs may be employed in the present invention. For example, and without limitation, each incoming sensor signal S1, S2 may be fed to an operational amplifier (OpAmp) OA, the output of which may be directed to a MOSFET transistor.

Upon exiting the amplification section 75 of the controller 70, the signals S1, S2 from the sensors 45, 50 may be directed to the incoming signal conditioning section 80. As would be understood by one of skill in the art, various signal conditioning techniques may be employed to remove interference and otherwise filter the sensor signals S1, S2 before they enter the microprocessor device 85. For example, and without limitation, the sensor signals S1, S2 may be conditioned by passing the signals through corresponding optical isolators and pulse conditioner circuitry associated with the signal conditioning section 80.

Once any desired upstream amplification and/or signal conditioning has been completed, the sensor signals S1, S2 are routed to corresponding inputs on the microprocessor device 85. The microprocessor device 85 may also be of various design, as would be understood by one of skill in the art. For example, the microprocessor device 85 may be a microcomputer or microcontroller. In any event, the microprocessor device 85 is associated with a program that allows the microprocessor device to evaluate the sensor signals S1, S2 and to determine whether the pulse generator plate 60 includes any bent and/or broken teeth 65 (as described in more detail below).

Once the microprocessor device 85 determines whether the pulse generator plate 60 includes any bent or broken teeth 65, a corresponding output signal may be generated to activate an appropriate indicator (as described in more detail below). In such a case, the generated output signal may be amplified in the output signal conditioning section 90 to provide sufficient current for powering an indicator, a relay, or another electronic device.

In use, the test fixture 40 is associated with a vehicle engine of interest, and positioned as described above so that the sensors 45, 50 are able to detect the teeth of the engine's pulse generator plate. If not already in communication therewith, the test fixture 40 is placed in communication with the controller 70, and power is provided to the controller. Preferably, the controller is provided with a start button 95 or a similar activation device that can be used to initialize a pulse generator plate analysis cycle.

Figure 4:
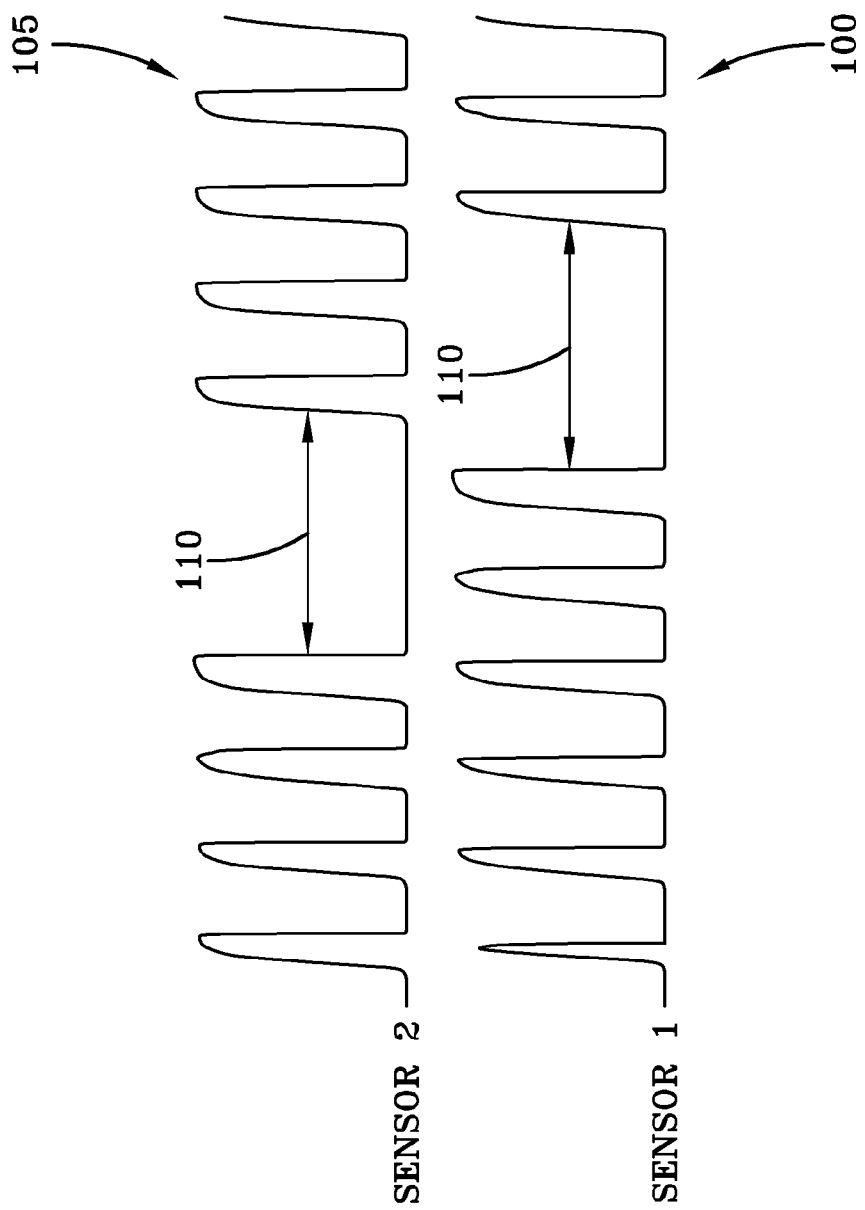
FIG. 4 represents a pulse train generated by a pair of sensors of the test fixture while the device of FIG. 2 is analyzing a non-defective pulse generator plate.
Figure 4:
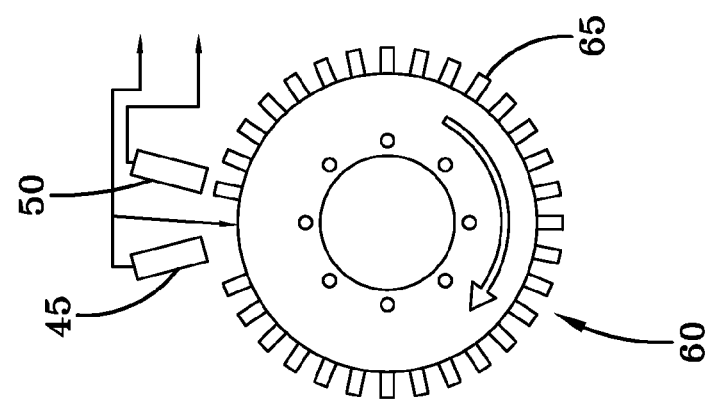
Figure 5:
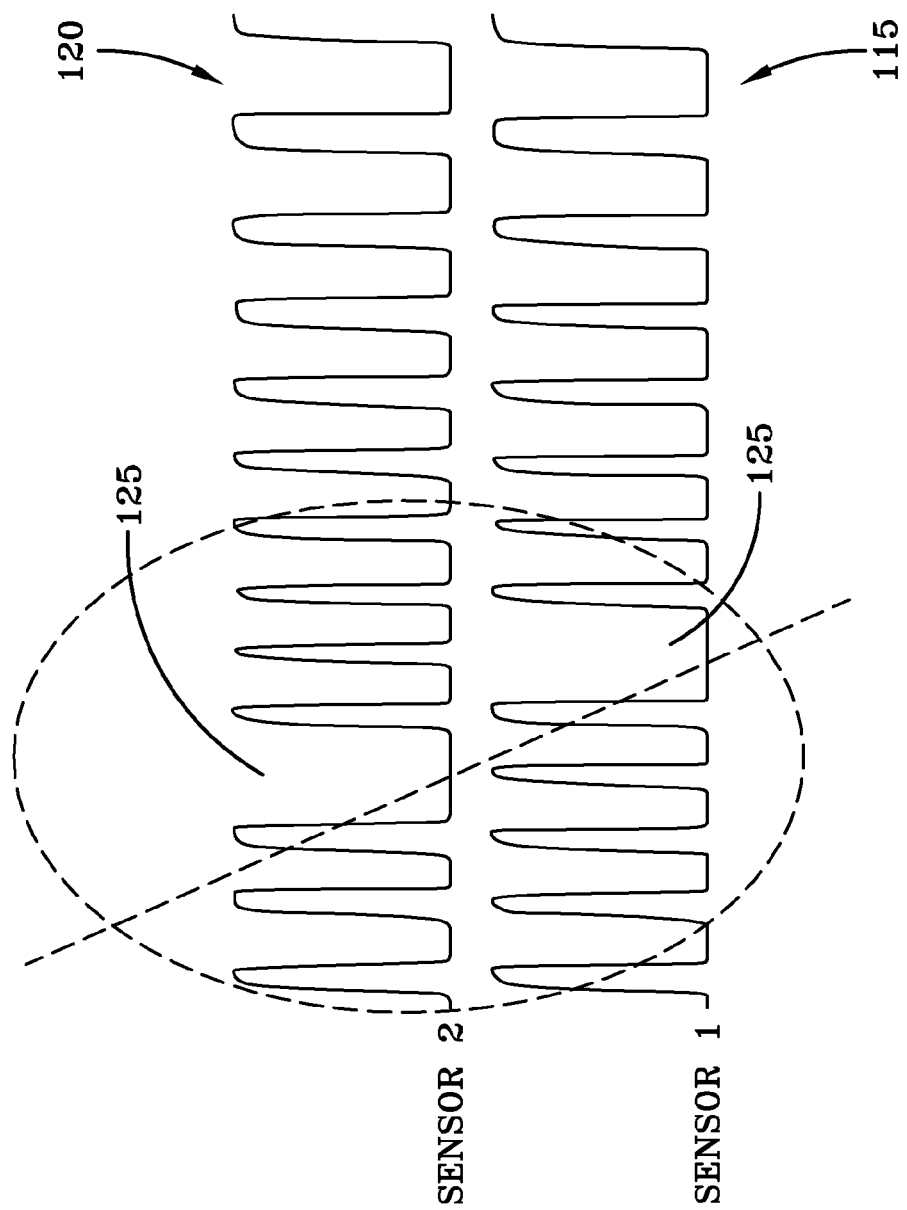
FIG. 5 represents a pulse train generated by the pair of sensors of the test fixture while the device of FIG. 2 is analyzing a pulse generator plate having a bent or broken tooth.
Figure 5:
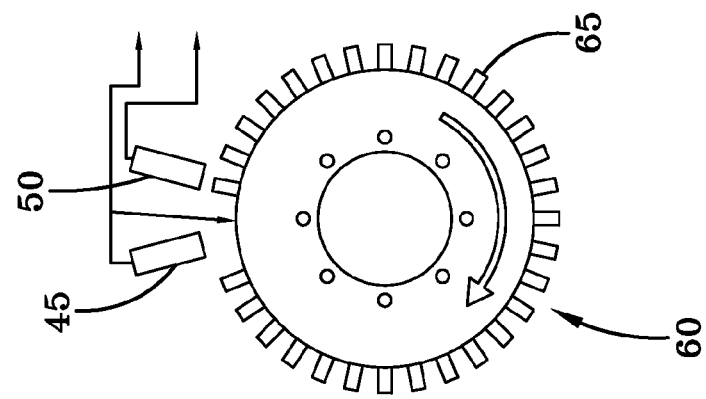
Figure 6:
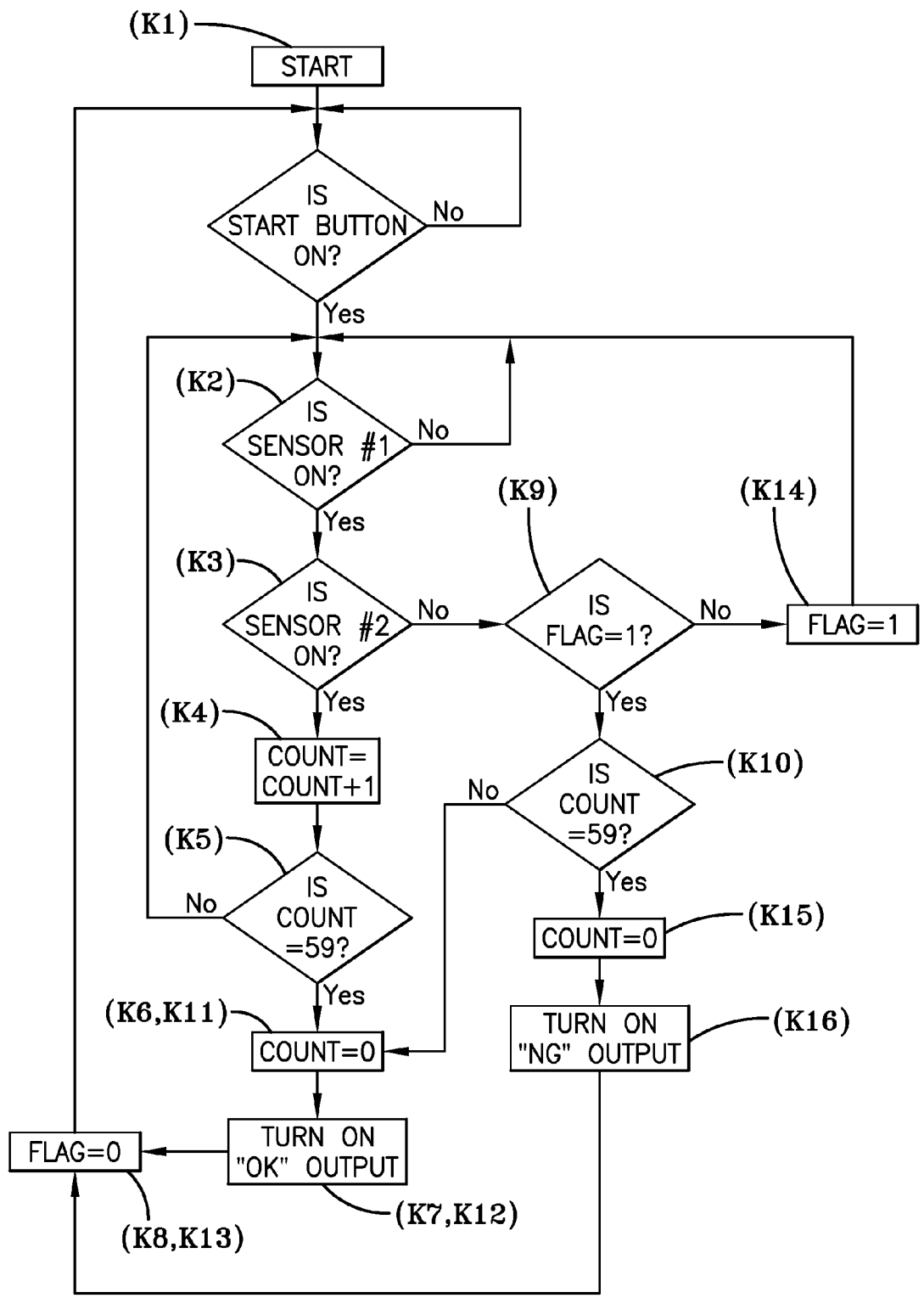
FIG. 6 is a flowchart illustrating the operation of a device of the present invention.

The operation of a device of the present invention can be better understood by reference to FIGS. 4-6. Referring to FIG. 4, it can be seen that as the pulse generator plate 60 is rotated in the presence of the test fixture 40 and its associated sensors 45, 50, an associated pulse train 100, 105 is generated by each of the sensors.

As can be seen in FIGS. 3-5, the first sensor 45 leads the second sensor 50 with respect to the direction of pulse generator plate rotation. In this particular embodiment, the first sensor 45 is separated from the second sensor 50 by an angle of approximately 15° (although other angles of separation are also possible). As such, the pulses of the pulse train 100 associated with the first sensor 45 lead the pulses of the pulse train 105 associated with the second sensor 50.

The number of pulses by which one pulse train leads another pulse train generated by a device of the present invention will be determined by the angle between the detection sensors of its test fixture and angle between the teeth of the pulse generator plate being analyzed. In this particular example, the pulse generator plate 60 has 58 teeth 65 (although less are shown for clarity), thus, the first pulse train 100 leads the second pulse train 105 by two pulses.

As can be seen in FIGS. 3-5, the exemplary pulse generator plate 60 being analyzed by the device 35 includes a reference slot 110 that allows the position of the pulse generator plate to be initially determined. In this particular example, the reference slot 110 is formed by the removal of two pulse generator plate teeth. Detection of the reference slot 110 by the detection sensors 45, 50 is evident in each of the pulse trains 100, 105. As is explained in more detail below, the microprocessor device 85 recognizes this reference slot 110 as a known feature of the pulse generator plate 60 and, therefore, will not erroneously interpret the reference slot as a bent or broken tooth 65.

A pulse train pair 115, 120 representative of a bent or broken pulse generator plate tooth is illustrated in FIG. 5. As shown, each of the detection sensors 45, 50 of the test fixture 40 once again produce a corresponding pulse train 115, 120 as the pulse generator plate 60 is rotated in their presence. As with the example of FIG. 4, the pulse train 115 associated with the first sensor 45 in this example also leads the pulse train 120 associated with the second sensor 50 by two pulses. However, in this example, the microprocessor device 85 has detected a bent or broken tooth 65 on the pulse generator plate 60, which is represented in the pulse trains 115, 120 by the gap 125. The method by which the microprocessor device 85 and its associated program analyzes the pulse trains 115, 120 to detect the presence of a bent or broken tooth 65 is explained in more detail below and illustrated in the flowchart of FIG. 6.

Referring now to FIG. 6, it can be seen that when the start button 95 of the device 35 is pressed (K1), the microprocessor device 85 and its associated program begins to monitor the output (K2) of the first sensor 45. When an output is detected from the first sensor 45, the microprocessor device 85 and its associated software begins to monitor the output (K3) of the second sensor 50.

If output signals S1, S2 are detected from both the first sensor 45 and the second sensor 50, the program proceeds to increase the tooth count by one (K4). The program then checks to see if the stored tooth count has reached a predetermined number, which number will depend on the total number of teeth that should be present on the pulse generator plate being analyzed. In this particular example, the predetermined number is 59. Therefore, as long as output signals S1, S2 are detected from both the first sensor 45 and the second sensor 50, the program will proceed to increase the tooth count until the count reaches 59 (K5).

In this particular example, once the tooth count has reached 59 with both the first and second sensor 45, 50 producing an output signal, the program determines that the pulse generator plate 60 does not contain any bent or missing teeth 65. At this point, the program also proceeds to reset the tooth counter to zero (K6), turns on an output (K7) that activates an appropriate indicator 130 (see FIG. 2), and resets a program flag to zero (K8). As mentioned above, such an indicator could be virtually any device capable of alerting a user to the results of the pulse generator plate analysis. In this particular example, the indicator 130 is a light notifying the user that no bent or broken teeth were detected.

If an output signal is detected from the first sensor 45 but not from the second sensor 50, the program proceeds to determine if the program flag value is set to one (K9). If the program flag value is set to one, the program determines if the tooth count is equal to 59 (K10). If the tooth count is not equal to 59, then the program once again resets the tooth counter to zero (K11), turns on the output (K12) to activate the indicator light 130 and notify the user that no bent or broken teeth were detected, and resets the program flag to zero (K13).

If an output signal is detected from the first sensor 45 but not from the second sensor 50, and the program determines that the program flag value is not set to one (K9), the program sets the program flag value to one (K14). Once the program flag value has been set to one, the program returns to the step of looking for detection sensor output signals (K2), (K3).

If an output signal S1 is detected from the first sensor 45 but not from the second sensor 50, and the program determines that the program flag value is set to one (K9) and the tooth count is equal to 59 (K10), the program sets the tooth count to zero (K15) and turns on an output that activates an appropriate indicator 135 (see FIG. 2) to notify the user that bent or broken teeth were detected on the pulse generator plate (K16).

In the above example, it can be understood that the program flag is set (to 1 in this case) when the reference slot 110 of the pulse generator plate 60 is first detected by the sensors 45, 50. Consequently, the program knows that if another gap is detected by the sensors before the count reaches 59 (in this example), the gap is indicative of a missing or bent tooth and not the return of the reference slot to the sensor position.

Therefore, it can be seen from the foregoing description and accompanying drawing figures that a device of the present invention can be used to quickly and easily detect bent or broken pulse generator plate teeth and indicate such to a user of the device. As would be understood by one of skill in the art, various embodiments of a device of the present invention may be constructed for this purpose. Therefore, while a particular exemplary embodiment of the present invention has been described in detail above, the scope of the invention is not to be considered limited by such disclosure, and modifications are possible without departing from the spirit of the invention as evidenced by the following claims:

What is claimed is:
1. A portable device for detecting defective teeth of a vehicle engine pulse generator plate, comprising:

a pair of detection sensors for temporary association with a vehicle engine of interest, said detection sensors adapted to detect the teeth of a pulse generator plate of said vehicle engine from a location external to said engine;

a controller in communication with said pair of detection sensors, said controller including at least a microprocessor device and an associated program; and an indicator in communication with said controller, said indicator activatable by said controller to inform a user of a damaged or undamaged pulse generator plate condition;

wherein said pair of detection sensors are arranged such that one sensor leads the other with respect to detecting the teeth of said pulse generator plate during rotation thereof; and wherein output signals generated by each detection sensor upon tooth detection produce a corresponding pulse train, said pulse trains evaluated by said program and said microprocessor device to detect any bent and/or unintentionally missing teeth on said pulse generator plate.

2. The device of claim 1, further comprising a housing within which said detection sensors are located.

3. The device of claim 2, wherein said housing is adapted to engage a portion of a vehicle engine of interest.

4. The device of claim 1, further comprising a housing for enclosing the components of said controller.

5. The device of claim 1, wherein said detection sensors are separated by an angle of approximately 15 degrees.

6. The device of claim 1, further comprising an amplification section associated with said controller, said amplification section for increasing the voltage of signals received from said detection sensors prior to forwarding thereof to said microprocessor device.

7. The device of claim 1, further comprising an incoming signal conditioning section associated with said controller, said signal conditioning section for removing interference from said sensor signals prior to routing of said sensor signals to said microprocessor device.

8. The device of claim 1, further comprising an output signal conditioning section associated with said controller, said output signal conditioning section for amplifying the current of an output signal of said microprocessor to a level sufficient to power an external electronic device.

9. The device of claim 8, wherein said external electronic device is selected from the group consisting of an indicator light and a relay.

10. A device for detecting defective teeth of a pulse generator plate installed to a vehicle engine, comprising:

a test fixture for temporary association with a vehicle engine of interest, said test fixture including a pair of detection sensors located within a housing, each sensor adapted to detect the teeth of a pulse generator plate of said vehicle engine and to produce an output signal upon detection of each tooth; and a controller in communication with said detection sensors of said test fixture, said controller including an amplification section for increasing the voltage of signals received from said detection sensors, and a microprocessor device and associated program for evaluating said sensor signals, said amplification section and said microprocessor device located within a housing;

wherein said test fixture is located to a vehicle engine of interest such that one detection sensor leads the other detection sensor with respect to detecting the teeth of said pulse generator plate during rotation thereof; and wherein output signals generated by each detection sensor upon pulse generator plate tooth detection produce an associated pulse train, said pulse trains evaluated by said program and said microprocessor device to detect any bent and/or missing teeth on said pulse generator plate.

11. The device of claim 10, wherein said test fixture housing is adapted to engage a portion of a vehicle engine of interest.

12. The device of claim 10, wherein said detection sensors are separated by an angle of approximately 15 degrees.

13. The device of claim 10, further comprising an incoming signal conditioning section associated with said controller, said signal conditioning section for removing interference from said sensor signals after amplification thereof and prior to routing of said sensor signals to said microprocessor device.

14. The device of claim 10, further comprising an output signal conditioning section associated with said controller, said output signal conditioning section for amplifying the current of an output signal of said microprocessor to a level sufficient to power an external electronic device.

15. The device of claim 14, wherein said external electronic device is selected from the group consisting of an indicator light and a relay.

16. The device of claim 15, wherein said indicator light is located on a housing of said controller.

17. A method for detecting defective teeth of a vehicle engine pulse generator plate, comprising:

(a) providing a pulse generator plate analyzer, said analyzer comprising:
  a test fixture for temporary association with a vehicle engine of interest, said test fixture including a pair of detection sensors located within a housing, each sensor adapted to detect the teeth of a pulse generator plate of said vehicle engine and to produce an output signal upon detection of each tooth, and
  a controller in communication with said detection sensors of said test fixture, said controller including an amplification section for increasing the voltage of signals received from said detection sensors, and a microprocessor device and associated program for evaluating said sensor signals;

(b) temporarily locating said test fixture to a vehicle engine of interest such that said detection sensors are within detection range of said pulse generator plate teeth and one detection sensor leads the other detection sensor with respect to detecting the teeth of said pulse generator plate during rotation thereof;

(c) providing power to said controller;

(d) activating said controller;

(e) rotating said vehicle engine pulse generator plate, thereby causing output signals to be generated by said detection sensors upon pulse generator plate tooth detection, the output signals of each sensor producing an associated pulse train;

(f) using said microprocessor device and said associated program to evaluate said pulse trains so as to detect any bent and/or missing teeth on said pulse generator plate; and (g) indicating the condition of said pulse generator plate to a user of the analyzer.

18. The method of claim 17, wherein a flag of said program is set upon detection of a reference slot (gap) between teeth of a pulse generator plate being analyzed.

19. The method of claim 18, wherein detection by said sensors of another gap between said teeth of said pulse generator plate being analyzed before a tooth count tracked by said program reaches a predetermined value, is indicative of a bent or missing tooth.

20. The method of claim 17, further comprising providing an incoming signal conditioning section associated with said controller to remove interference from said sensor signals prior to routing of said sensor signals to said microprocessor device.

\* \* \* \* \*